J. D. THARP.
POST SEAT FOR CARS.
APPLICATION FILED AUG. 15, 1908.
921,310.
Patented May 11, 1909.
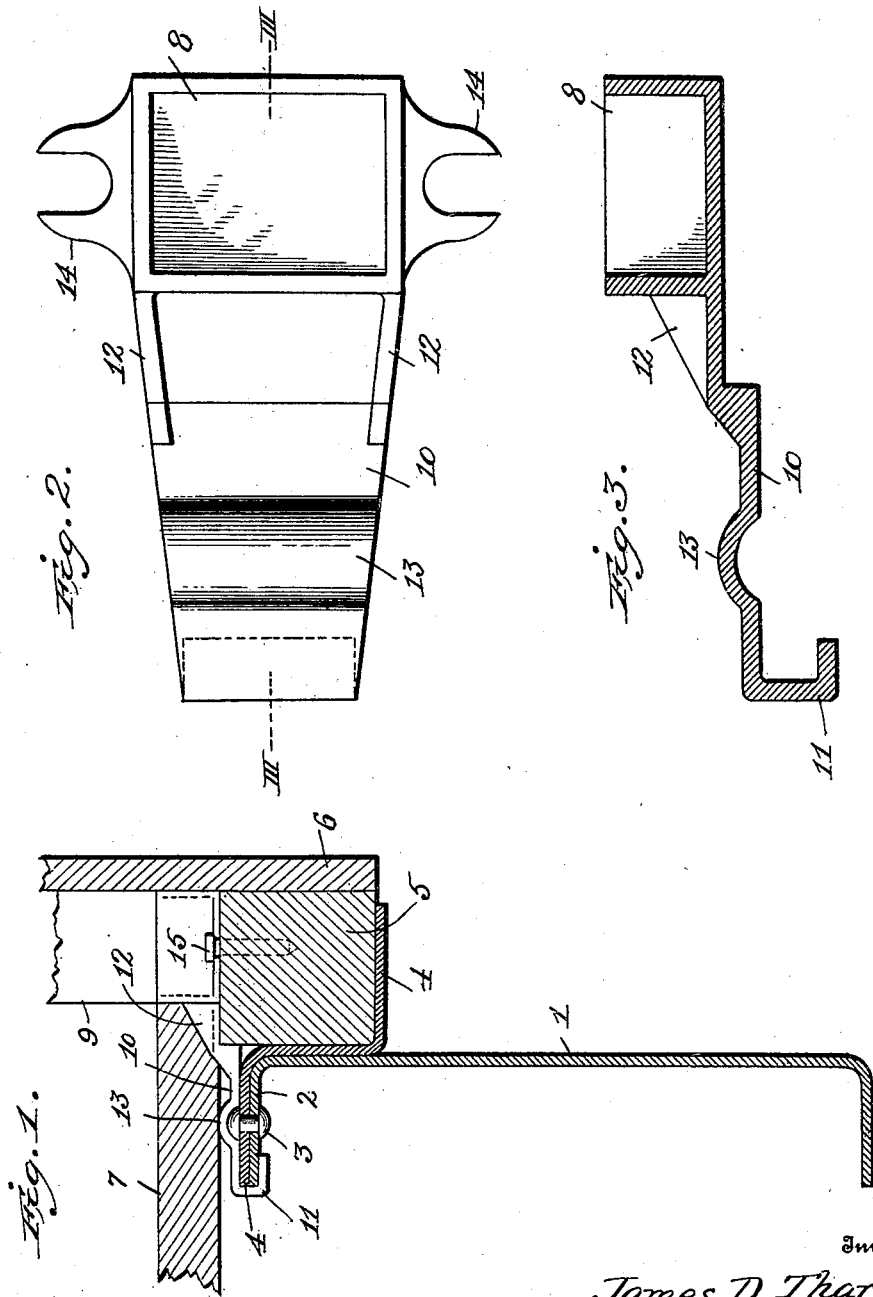

UNITED STATES PATENT OFFICE.

JAMES D. THARP, OF ARDARA, PENNSYLVANIA.

POST-SEAT FOR CARS.

No. 921,310.  Specification of Letters Patent.  Patented May 11, 1909.

Application filed August 15, 1908. Serial No. 448,697.

*To all whom it may concern:*

Be it known that I, JAMES D. THARP, a citizen of the United States, residing at Ardara, in the county of Westmoreland and State of Pennsylvania, have invented certain new and useful Improvements in Post-Seats for Cars, of which the following is a specification.

My invention relates to seats for the door posts of box or stock cars, and has for its object to provide an improved construction of the same, whereby all danger of said seat yielding outwardly is effectually prevented. This object I accomplish in the manner and by the means hereinafter described and claimed, reference being had to the accompanying drawings in which:

Figure 1 is a vertical transverse sectional view of a portion of a freight car with a steel underframe showing my improved seat in position thereon. Fig. 2 is an enlarged detail top plan view of said seat. Fig. 3 is a vertical sectional view of said seat on the line III—III, Fig. 2.

Similar numerals of reference denote corresponding parts in the several views.

In the said drawings the reference numeral 1 denotes the channel forming part of the steel underframe, to the upper inwardly projecting horizontal flange 2 of which is fastened by rivets 3 the angle plates 4 which support the wooden longitudinal car sill 5, which sill serves as a nailing strip for the attachment of the side wall 6 and the floor decking 7.

Mounted on the sill 5 is my improved seat formed of a metal casting and embodying a socket 8 for the reception of the door post 9, and an extension 10 that is bent under at its inner end at 11 to embrace the flange 2 and angle plate 4. This extension may be provided with side strengthening ribs 12 and may be curved transversely at 13 intermediate its length to leave room for the rivets 3 and yet permit said extension to lie flush with the angle plate 4. The socket 8 is provided on each side with ears 14 to receive fastening screws 15 which retain it against lateral movement on the sill 5.

From the above description it will be seen that with the bent inner end 11 of the extension 10 hooked around the inner edge of flange 2 of the channel 1 of the steel underframe any movement of the socket 8 in an outward direction is effectually prevented and it is impossible for the door post 9 to yield against pressure from the inside.

Having thus described the invention, what is claimed as new and desired to be secured by Letters-Patent, is:

1. A seat for the door posts of cars, embodying a socket for the reception of the door post having a hook extending therefrom to engage the car frame.

2. A seat for the door posts of cars, embodying a socket for the reception of the door post, an extension formed integral with said socket, and a hooked inner end to said extension.

3. A seat for the door posts of cars, embodying a socket for the reception of the door post, side ears on said socket, an extension formed integral with said socket, and a hooked inner end to said extension.

4. In combination with a car frame, a door post seat embodying a socket adapted to rest on said car frame, means for permanently retaining said seat in position, and means independent of said retaining means for preventing outward tilting movement to said post seat.

5. In combination with the side sill of a car, and its steel underframe, a door post seat embodying a socket adapted to rest on said side sill, and an extension formed integral with said socket, extending inwardly over the steel underframe and hooked at its inner end to engage said steel underframe.

In testimony whereof I affix my signature, in presence of two witnesses.

JAMES D. THARP.

Witnesses:
 JAMES F. BLAKE,
 JOHN H. WATSON.